(12) United States Patent
Arato et al.

(10) Patent No.: US 6,442,178 B1
(45) Date of Patent: Aug. 27, 2002

(54) SYSTEM AND METHOD FOR DATA ALIGNMENT IN A COMMUNICATION SYSTEM

(75) Inventors: Laszlo Arato, Tinton Falls; Emile G. Massaad, Eatontown, both of NJ (US)

(73) Assignee: GlobespanVirata Inc., Red Bank, NJ (US)

( * ) Notice: Subject to any disclaimer, the term of this patent is extended or adjusted under 35 U.S.C. 154(b) by 0 days.

(21) Appl. No.: 09/164,329

(22) Filed: Oct. 1, 1998

Related U.S. Application Data

(60) Provisional application No. 60/060,651, filed on Oct. 1, 1997.

(51) Int. Cl.⁷ .............................. H04J 3/06; G06F 7/00
(52) U.S. Cl. .................... 370/506; 370/466; 370/503; 370/505; 710/100; 712/300; 714/100
(58) Field of Search ................................ 370/464, 465, 370/466, 467, 503, 505, 506, 537; 710/100, 105, 126, 130; 712/300; 714/43, 100

(56) References Cited

U.S. PATENT DOCUMENTS

| | | | | |
|---|---|---|---|---|
| 3,983,380 A | * | 9/1976 | Sharif et al. ................ | 235/156 |
| 4,011,548 A | * | 3/1977 | Panigrahi .............. | 340/173 CA |
| 4,167,028 A | * | 9/1979 | Tobey ........................ | 360/72.2 |
| 5,257,325 A | * | 10/1993 | Casparian et al. ............ | 382/44 |
| 5,341,371 A | * | 8/1994 | Simpson .................... | 370/85.4 |
| 5,400,349 A | * | 3/1995 | Tom .......................... | 371/47.1 |
| 5,471,466 A | * | 11/1995 | Cooperman ................ | 370/58.1 |
| 5,696,928 A | * | 12/1997 | Grewe et al. ................ | 395/430 |
| 5,822,620 A | * | 10/1998 | Malik et al. ................. | 395/898 |
| 5,857,083 A | * | 1/1999 | Venkat ........................ | 395/309 |
| 5,948,111 A | * | 9/1999 | Taylor et al. ................. | 714/10 |
| 5,991,852 A | * | 11/1999 | Bagley ........................ | 711/112 |
| 6,006,343 A | * | 12/1999 | Whetsel ........................ | 714/28 |
| 6,141,716 A | * | 10/2000 | Kwon .......................... | 710/128 |
| 6,192,498 B1 | * | 2/2001 | Arato .......................... | 714/781 |

OTHER PUBLICATIONS

Al Chamë, "Applications Information Interfacing the 68360 (QUICC) to T1/E1 Systems," Motorola Semi–conductor Technical Information, http://www.mot.com/netcom/docs/pubs/360toT1.html, Dec. 4, 1996.

"Communications Processor Module (CPM)," Motorola MC68360 Quad Integrated Communications Controller User's Manual, rev. 1, ch. 7, Dec. 4, 1996, pp. 7–1–7–381.

* cited by examiner

*Primary Examiner*—Hassan Kizou
*Assistant Examiner*—Joe Logsdon
(74) *Attorney, Agent, or Firm*—Thomas, Kayden, Horstemeyer & Risley

(57) ABSTRACT

A parallel-to-serial-to-parallel circuit are disclosed, the circuit interfacing with a data bus, preferably with a processor for byte alignment and other operations. The parallel-to-serial-to-parallel circuit includes an input bit shift register having a predetermined number of register positions and an output bit shift register with the same number of register positions. The output of the input bit shift register is fed into the output bit shift register through a multiplexer. The input bit shift register may receive a bit write from a bit bus, a partial parallel write from a data bus with corresponding data validity data received on a shadow bus, and full parallel write from the data bus. The output bit shift register may transmit a bit read to the bit bus or a full parallel read to the data bus. Data received is shifted to the output bit shift register and compiled into full parallel data or read out as single bits. Offset bits may be introduced in the data stream for data alignment. The present invention also provides a further advantage of including the ability to perform various bit stuffing and bit scrambling operations.

13 Claims, 2 Drawing Sheets

SYSTEM AND METHOD FOR DATA ALIGNMENT IN A COMMUNICATION SYSTEM

CROSS REFERENCE TO RELATED APPLICATIONS

This application claims the benefit of United States provisional patent application entitled "Programmable Framer for HDSL Transmissions" filed on Oct. 1, 1997 and afforded Ser. No. 60/060,651, the entire text of which is incorporated herein by reference.

STATEMENT REGARDING FEDERALLY SPONSORED RESEARCH OR DEVELOPMENT

Not Applicable.

TECHNICAL FIELD

The present invention relates to the field of data communications, and more particularly, to the field of data alignment in a communications system.

BACKGROUND INFORMATION

In data communications, data is generally transmitted in a serial communications format through current networks. It is often the case that the data to be transmitted between two data endpoints is packaged according to specific data communications protocols to facilitate the transmission across the particular network in question. This packaging may include the addition of network management and other information such as headers and trailers to the data to facilitate transmission based upon the dictates of the particular protocol employed. Such packaging is generally termed "framing" in the art.

Some of these protocols may include, for example, data transmission using time division multiplexing (TDM) approaches such T1 and E1 standards known in the art. Other example standards may include high-level data link control (HDLC) or asynchronous transfer mode (ATM). Each of these protocols have their own applications and goals in terms of history, performance, error-immunity, flexibility, and other factors. Consequently, each of these protocols employ framing procedures by which data is packaged for transmission across the various networks employed. These protocols are generally incompatible and require translation or conversion to transmit data in a transmission link that employs two or more protocols in two or more different segments.

The conversion from one protocol to another requires specific framing technology to accomplish the task. With a myriad of standards between which conversion is possible, many different dedicated protocol conversion units have been developed to accomplish the specific conversion tasks presented. The typical protocol conversion unit is labeled "dedicated" above because such units generally employ dedicated circuits which are capable only of performing the conversion from one specific protocol to another. The result of this fact is a multitude of protocol conversion units on the market to accomplish the individual conversion tasks, thereby diminishing efficiencies to be obtained by mass production.

It is also the case that new communications standards are developed as data communication technology develops over time. Often times, a particular standard may be in flux while discussion ensues among those skilled in the art until agreement on concrete provisions articulating a standard is reached. Consequently, it is difficult to develop data communications technology that employs an up and coming standard until the standard is settled. In the competitive world of data communications technology production, it is desirable to produce products to meet these new standards as quickly as is possible after a standard is finalized so as to compete in the marketplace.

BRIEF SUMMARY OF THE INVENTION

It is an objective of the present invention to provide for technology which can achieve protocol conversions between any number of protocols to obtain the efficiencies of mass production and feature the flexibility allowing the unit to be quickly adapted to new data communications protocols as they develop. In addition, there is a second objective to provide for corresponding circuits which can perform specific tasks in conjunction with the aforementioned protocol conversions. For example, some protocols require the performance of byte alignment and other similar functions.

In furtherance of these and other objectives, the present invention entails a parallel-to-serial-to-parallel (PSP) circuit that interfaces with a data bus, preferably with a processor, for byte alignment and other operations. The PSP circuit includes an input bit shift register having a predetermined number of register positions and an output bit shift register with the same number of register positions. The output of the input bit shift register is fed into the output bit shift register through a multiplexer. The input bit shift register may receive a bit write from a bit bus, a partial parallel write from a data bus with corresponding data validity data received on a shadow bus, and full parallel write from the data bus. The output bit shift register may transmit a bit read to the bit bus or a full parallel read to the data bus. Data received is shifted to the output bit shift register and compiled into full parallel data or read out as single bits. Offset bits may be introduced in the data stream for data alignment. The present invention also provides a further advantage of including the ability to perform various bit stuffing and bit scrambling operations.

In accordance with another aspect of the present invention, a method is provided for achieving byte alignment and other objectives, comprising the steps of reading a predetermined number of bits from a data bus, the predetermined number of bits being out of alignment relative to the data bus. Secondly, the step of shifting the predetermined number of bits into alignment with the data bus is performed, and finally the aligned data is written to the data bus in either a fill parallel write or to the bit bus in a bit write.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
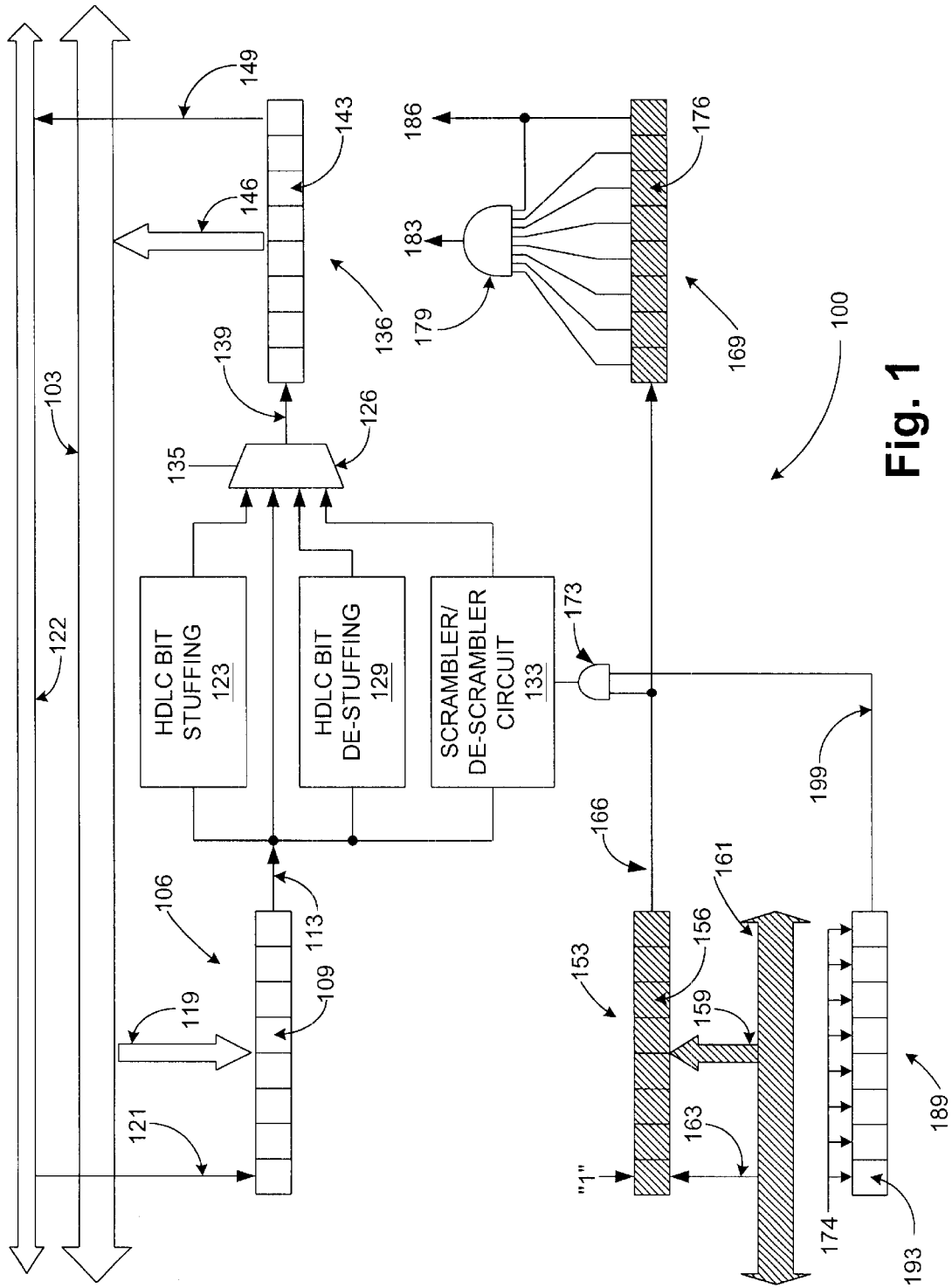
FIG. 1 is a block diagram of a parallel-to-serial-to-parallel circuit according to an embodiment of the present invention.

Turning to FIG. 1, shown is a block diagram of a parallel-to-serial-to-parallel (PSP) circuit 100 according to the present invention. The PSP circuit 100 is advantageously designed to perform byte alignment functions for specific data communications protocols as well as additional functions as will be discussed herein. The PSP circuit 100 may be electrically coupled to a data bus 103, for example, in a programmable digital processor circuit employed to accomplish the data communications protocol conversion such as the processor circuit shown in United States Patent Application entitled "System and Method for Protocol Conversion in a Data Communications System", filed on even date herewith, and assigned Ser. No. 09/164,969, the entire text of which is incorporated herein by reference.

Electrically coupled to the data bus 103 is an input bit shift register 106. The input bit shift register 106 is comprised of a predetermined number of input register positions 109 and a bit shift output 113. The input bit shift register 106 generally comprises a predetermined number of D flip-flops, each D flip-flop acting as an input register position 109. The input bit shift register 106 can receive a full or partial parallel write 119 from the data bus 103. The input bit shift register 106 can also receive a bit write 121 from a bit bus 122 associated with the rest of a processor circuit of which the PSP circuit 100 is a part. A bit write 121 is received from the bit bus 122 and the parallel write 119 refers to all input register positions 109 receiving a bit from the entire data bus 103. A partial parallel write 119 is performed like a parallel write, except not all bits received from the data bus 103 are valid, as will be discussed.

The bit shift output 113 is applied to a high-level data link control (HDLC) bit stuffing circuit 123. An output from the HDLC bit stuffing circuit 123 is applied to a first input of a control multiplexer 126. The bit shift output 113 is also applied to a second input of the control multiplexer 126, an HDLC bit de-stuffing circuit 129, and a scrambler/de-scrambler circuit 133. An output from the HDLC bit de-stuffing circuit 129 is applied to a third input of the control multiplexer 126, and an output from the scrambler/de-scrambler circuit 133 is applied to a fourth input of the control multiplexer 126. The control multiplexer 126 includes a control input 135 which determines which control multiplexer input is applied to the control multiplexer output. The control input 135 is received from the a control and address bus of a processor circuit of which the PSP circuit 100 is a part.

The PSP circuit 100 also includes an output bit shift register 136. The output of the control multiplexer 126 is received as a bit shift input 139 of the output bit shift register 136. The output bit shift register 136 generally comprises a predetermined number of D flip-flops, each D flip-flop acting as an output register position 143. In the preferred embodiment, the number of output register positions 143 is equal to the number of input register positions 109 of the input bit shift register 106. The outputs of the D flip-flops are coupled to both the data bus 103 and to the input of an adjacent D flip-flop to facilitate bit shifting, with the exception of the right most D flip flop output which is coupled only to the data bus 103. The output bit shift register 136 can be read by a processor in a parallel read 146. Also a bit read 149 to the bit bus 122 may be performed. When a parallel read 146 is executed, a processor reads the outputs of all of the output register positions 143 through the data bus 103. When a bit read 149 is executed, the output of the least significant bit of the output bit shift register 136, which is the output of the right most output register position 143, is read to the bit bus 122.

The PSP circuit 100 further includes an input shadow register 153 with a number of shadow register positions 156 equal to the number of input register positions 109 of the input bit shift register 106. The input shadow register 153 can receive a partial parallel or a full parallel register write 159 from a shadow bus 161 The most significant bit 163 of the input shadow register 153 receives a logical "1" upon a bit write. The input shadow register 153 further includes a shadow register output 166 which is applied to an input of an output shadow register 169. The shadow register output 166 is also applied to an input of a scrambler/de-scrambler AND gate 173.

The output shadow register 169 comprises a number of register positions 176 equal to the number of output register positions 143. Also, similar to the output bit shift register 136, the output shadow register 169 comprises a number of cascaded D flip-flops (not shown). Each output of the respective register positions 176 of the output shadow register 169 is applied to one of a number of inputs of a register write AND gate 179, which provides a full parallel write available output 183. The output of the register position 176 which holds the least significant bit of the output shadow register 169 provides a bit write available output 186.

In addition, the PSP circuit 100 includes a scramble enable register 189 with a number of register positions 193 equal to the number of input register positions 109 of the input bit shift register 106. The register positions 193 employ cascaded D flip flops. Each register position 193 of the scramble enable register 189 receives a scramble enable signal input 174 which is a logical "1" for scrambling and a logical "0" if the data is not to be scrambled. A scramble register output 199 is applied to a second input of the scrambler/de-scrambler AND gate 173. The output of the scrambler/de-scrambler AND gate 173 enables the operation of the scrambler/descrambler circuit 133.

Next the operation of the PSP circuit 100 is described. The PSP circuit 100 is particularly suited for performing the task of byte alignment. This function may be necessary, for example, for communications protocols which package data in bytes such as asynchronous transfer mode (ATM). When data is translated from an unspecified protocol to an ATM protocol, it happens that the data information is not always byte aligned with the data bus in that the data bus will process parts of two different bytes as the data bytes are offset by a random number of bits. In order to align data bytes with the data bus, a signal is applied to the control input 135 which causes the second multiplexer input to be applied to the output of the control multiplexer 126, thereby directly coupling the bit shift output 113 to the bit shift input 139. Next, a predetermined number of bits are written from the data bus 103 to the input bit shift register 106 in a number of bit writes 121. The actual number of bit writes 121 performed depends upon the particular bit offset necessary to achieve byte alignment.

A logical "1" is written to the input shadow register 153 corresponding to the bit writes 121 to indicate that these bits are valid data. These initial bits are shifted all the way to the right most output register positions 143 of the output bit shift register 136. The corresponding bits in the input shadow register 153 are simultaneously shifted to the right into register positions 176 which mirror the bits in the output bit shift register 136. The precise bit shifting operation performed in the input shadow register 153 and the input bit shift register 106 will be discussed in later text.

After an appropriate number of offset bits sit in the right most output register positions 143 of the output bit shift register 136, an entire non-aligned byte is written to the input bit shift register 106 in a parallel write 119 with a shadow register write 159 of logical "1's" being written to the input shadow register 153. The appropriate number of bits out of those written to both the input bit shift register 106 and the input shadow register 153 are shifted into the remaining empty left most register positions of the output bit shift register 136 and the output shadow register 169. When the output bit shift register 136 is full as indicated by a full output shadow register 169 (with logical "1's), then a logical "1" is seen at the full parallel write available output 183. This is detected by processor on a control bus (not shown). Thereafter, a parallel read 146 from the output bit shift register 136 to the data bus 103 is performed, the data being byte aligned. The remaining bits in the input bit shift register 106 are shifted to the output bit shift register 136 and the process is repeated by writing a new non-aligned byte to the input bit shift register 106. All input data is similarly shifted to achieve byte alignment with the number of offset bits remaining in the PSP circuit 100.

Note that although the above discussion describes full register reads, a bit read 149 may also be performed when the processor is alerted to the existence of a bit to read in the right most output register position 143 of the output bit shift register 136 as indicated by a logical "1" at the bit write available output 186 which is made available an a status register (not shown).

The PSP circuit also allows partial byte writes to the input bit shift register 106. In actuality, a full parallel write 119 is performed during a partial parallel write, however, only the bits which comprise actual or valid data bits receive a logical "1" in the corresponding input shadow register 153. The PSP circuit 100 is thus able to discern whether a particular parallel write 119 is in fact a partial byte write or a full byte write. The occurrence of a partial write is discussed in greater detail in later text.

The PSP circuit 100 may also be used to perform a bit stuffing operation as required by some communications protocols such as, for example, an HDLC protocol. In such a case, the control input 135 is set to cause the first input of the control multiplexer 126 to be applied to the control multiplexer output. The HDLC bit stuffing circuit 123 is coupled between the input bit shift register 106 and the output bit shift register 136. The HDLC bit stuffing circuit 123 causes a predetermined number of control bits to be injected into the bit stream between specified numbers of data bits according to a specific criteria. Such control bits are merely shifted into the output bit shift register 136 as needed. Similarly, the HDLC bit de-stuffing circuit 129 periodically removes the same control bits from the data stream accordingly. The HDLC bit de-stuffing circuit 129 is enabled by applying a control input 135 to the control multiplexer 126 that causes the third multiplexer input to be read to the multiplexer output. Similarly then, the HDLC bit de-stuffing circuit 129 is coupled between the input bit shift register 106 and the output bit shift register 136.

Finally, the PSP circuit 100 may be used to perform a scrambling or de-scrambling operation. To function as a scrambler or de-scrambler, the control input 135 is set to cause the control multiplexer 126 to apply the fourth multiplexer input to the multiplexer output, where the data shifted from the input bit shift register 106 is sent through the scrambler/de-scrambler circuit 133. In this manner, the scrambler/de-scrambler circuit 133 is coupled between the input bit shift register 106 and the output bit shift register 136. The scrambler/de-scrambler circuit 133 operates on all valid data, whether they be a bit write 121 or a parallel write 119, whether it be a full byte or a partial byte. A previously mentioned, a logical "1" is written into shadow register positions 156 of the input shadow register 153 which correspond to input register positions 109 of the valid data written into the input bit shift register 106. In addition, a logical "1" is written to each register position in the scramble enable register 189. As the bits are simultaneously shifted out of the input bit shift register 106, the input shadow register 153, and the scramble enable register 189, the scrambler/de-scrambler AND gate 173 outputs a logical "1" which enables the scrambler/de-scrambler circuit 133 which operates on the valid data. Where data is invalid as indicated by a logical "0" in the input shadow register 153, the scrambler/de-scrambler AND gate 173 outputs a logical "0" and the operation of the scrambler/de-scrambler circuit 133 is disabled. In this manner, the PSP circuit 100 scrambles and de-scrambles data based on the predefined criteria of a specific data communications protocol.

Figure 2:
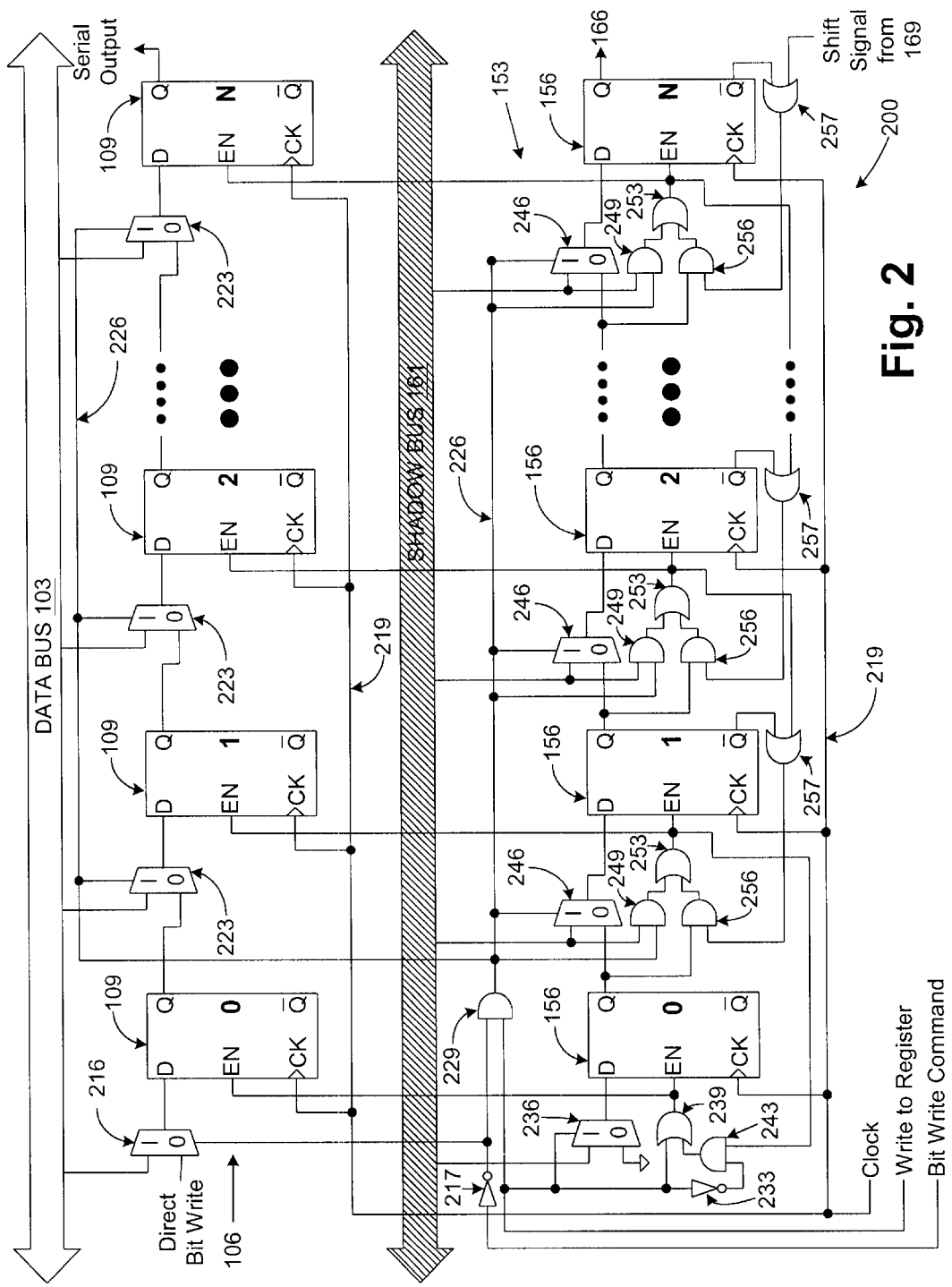
FIG. 2 is a schematic of a first-in-first-out register employed in the parallel-to-serial-to-parallel circuit of FIG. 1.

Turning to FIG. 2, shown is a FIFO register circuit 200 employed by the PSP circuit 100. The FIFO register circuit 200 includes a input bit shift register 106 which is comprised of a number of input register positions 109 and a input shadow register 153 with an equal number of shadow register positions 156. For purposes of this discussion, the input register positions 109 and the shadow register positions 156 are numbered from 0 to N as shown. In the preferred embodiment, there are eight actual input and shadow register positions 109 and 156, where N=7, however, any number of register positions may be employed. The input register positions 109 and shadow register positions 156 are actually comprised of, for example, positive level static D flip-flops, however, it is understood that other circuit components may be employed in the place of the D flip-flops which will perform the functions of the D flip-flops as shown herein.

Referring first to the input bit shift register 106, the input D of the D flip-flop which comprises the $0^{th}$ input register position 109 (hereafter "the $0^{th}$ D flip-flop") is coupled to an output of a bit write multiplexer 216. The bit write multiplexer 216 includes a first input coupled to the data bus 103 and a second input coupled to the bit bus 122 (FIG. 1), through which a direct bit write signal is received. The bit write multiplexer 216 also includes a control input which is coupled to the bit bus 122 through a first NOT gate 217, which is triggered by a bit write command from the bit bus 122. The enable input EN of the $0^{th}$ D flip-flop is coupled to the enable input EN of a corresponding D flip-flop comprising the $0^{th}$ shadow register position 156 of the input shadow register 153. Note that the enable inputs EN of all D flips flops in corresponding register positions 109 and 156 are coupled together, respectively.

The clock input CK of the $0^{th}$ D flip-flop is coupled to a common clock line 219 which is coupled to the clock inputs CK of all the D flip-flops in the input bit shift register 106 and the input shadow register 153. The output Q of the $0^{th}$ D flip-flop is coupled to a first input of a data/shift multiplexer 223. The second input of the data/shift multiplexer 219 is coupled to the data bus 103. Additional data/shift multiplexers 219 are similarly coupled between the subsequent D flip flops that comprise the input register positions 109 as shown. Each data/shift multiplexer 219 includes a control input to toggle between the first and second inputs, the control inputs being coupled to a write control line 226. The output Q of the D flip flop at the final $N^{th}$ input register position 109 serves as a serial output of the input bit shift register 106 and is coupled to appropriate circuitry.

The write control line 226 is coupled to the output of a write AND gate 229. The write AND gate 229 has a first input coupled to the output of the first NOT gate 217 and a second input coupled to an address/control bus (not shown) through which a "write to register" command is received. The same write to register command from the address/control bus is coupled to the input of a second NOT gate 233, a control input of a $0^{th}$ shadow multiplexer 236, and a first input of an initial OR gate 239. The output of the second NOT gate 233 is coupled to a first input of an initial shift AND gate 243. The output of the initial shift AND gate 243 is coupled to an input of the initial OR gate 239. The output of the initial OR gate 239 is coupled to the enable inputs of the D flip-flips in the $0^{th}$ input register position 109 and the $0^{th}$ shadow register position 156. The $0^{th}$ shadow multiplexer 236 has a first input coupled to the shadow bus 161, and a second input coupled to ground which acts as a logical "0". The output of the $0^{th}$ shadow multiplexer 236 is coupled to the input D of the $0^{th}$ D flip-flop.

The first and second NOT gates 217 and 233, $0^{th}$ shadow multiplexer, initial shift AND gate 243, the write AND gate 229, and the initial OR gate 239 comprise a front end circuit before the $0^{th}$ shadow register position 156. Thereafter, a common circuit is employed between the remaining register positions 156 which facilitates the use of both the input bit shift register 106 and the input shadow register 153 to write data to, and to shift the data. Note that the output Q of the $N^{th}$ shadow register position 156 acts as the shadow register output 166 which is coupled to the output shadow register 169.

This common circuit includes a write/shift multiplexer 246, a write enable AND gate 249, an enable OR gate 253, a shift enable AND gate 256, and a shift OR gate 257. The write/shift multiplexer 246 includes a control input which is coupled to the write control line 226, a first input which is coupled to the shadow bus 161, and a second input coupled to the output Q of the previous D flip-flop. The write enable AND gate 249 has a first input coupled to the shadow bus 161, a second input coupled to the write control line 226 and an output coupled to an input of the enable OR gate 253. The shift enable AND gate 256 has a first input coupled to an output of the shift OR gate 257, a second input coupled to the output Q of the previous D flip-flop, and an output coupled to a second input of the enable OR gate 253. The shift OR gate 257 has a first input coupled to the inverted output $\overline{Q}$ of the current D flip-flop as shown, and a second input coupled to the output of the enable OR gate 253 which is coupled to the enable input of the following D flip-flop as shown. Note that the rightmost shift OR gate 257 differs in that it receives an input from the output shadow register 169, which enables a bit stored in the right most input register position 109 to be shifted to the output bit shift register 136.

Next the operation of the FIFO register circuit 200 is discussed. The above circuit facilitates either a full parallel write, a partial parallel write, and a single bit write to the input bit shift register 106. In all cases, each bit in the input bit shift register 106 which comprises valid data receives a logical "1" in the corresponding shadow register position 156. Only those bits in the input bit shift register 106 with a logical "1" in their corresponding shadow register position 156 are shifted to the serial output of the FIFO register circuit 200. Both the bits in the input bit shift register 106 and corresponding bits in the input shadow register 153 are shifted simultaneously.

In the case of a full parallel write to all of the input register positions 109 from the data bus 103, a corresponding full parallel write to the shadow register positions 156 is executed from the shadow bus 161. With a full parallel write, all of the shadow register positions 156 will receive a logical "1" from the shadow bus 161, where a logical "1" is placed on all conductors of the shadow bus 161 unless a partial parallel write is performed.

During a partial parallel write, a full parallel write is performed to the input register positions 109 from the data bus 103 and a full parallel write is performed to the shadow register positions 156 from the shadow bus 161. However, in a partial parallel write, at least one of the data bits written from the shadow register will be a logical "0" which indicates that the corresponding bit in the input bit shift register 106 is invalid. In such a case, only valid bits which are part of the partial parallel write are shifted to the serial output of the input bit shift register 106.

Finally, a bit write is performed to the left-most input register position 109 and corresponding shadow bit is written to the left-most shadow register position 156 from the bit bus 122. Thereafter, both the data bit and the shadow bit are shifted across the data and shadow register positions until the bit is supplied to the serial output. When a partial parallel write, full parallel write, or bit write is performed, the FIFO register circuit 200 is in a write mode, otherwise the FIFO register circuit 200 is in a shift mode as detailed below.

First the operation of a bit write is discussed in detail. When a bit write is to be performed, the bit write command is set to a logical "1" or set "high", which causes a low output at the first NOT gate 217 which, in turn, causes the bit write multiplexer 216 to couple the bit write conductor of the bit bus 122 to the input of the $0^{th}$ D flip-flop. In addition, the output of the write AND gate 229 is a logical "0", or is "low" which places the remainder input register positions 109 and shadow register positions 156 in a shift mode where the data/shift multiplexers 223 and the write/shift multiplexers 246 are set to cause the outputs Q of the D flip-flops to be fed into the inputs D of the adjacent D flip-flops as shown. The "write to register" command is set high, resulting in a high output at the initial OR gate 239 which enables the $0^{th}$ D flip-flop, and, a high control signal is applied to the $0^{th}$ shadow multiplexer 236 which applies a shadow bit from the shadow bus 161 to the first shadow register 156 (the $0^{th}$ D flip-flop). Although a logical "1" is placed on all the remaining conductors of the shadow bus 161, only the shadow bit from the first shadow register 156 is enabled to receive the logical "1".

In an alternative explanation of a bit write operation, the leftmost register positions of the input and shadow register positions 109 and 153 may operation in one of two modes. In the case where a "Bit Write Command" is transmitted, a single data bit from the bit bus 122 is applied through the bit write multiplexer 216 to the leftmost register position 109. At the same time bit seven of the shadow bus 161 is applied through the $0^{th}$ shadow multiplexer 236 to the leftmost register of the input shadow register 153. Both leftmost register positions 109 and 156 are enabled through the "Write-to-Register" signal through the initial OR gate 239, so that on the next rising edge of the clock signal 219, the applied data and shadow bits are written into the leftmost registers. At the same time, the "Bit-Write-Command" signal, inverted by the first NOT gate 217 inhibits the write AND gate 229 so that only one single bit is loaded into the leftmost register position 109, and only one single data bit is loaded into the leftmost shadow register position 156. As all bits of the shadow bus 161 are always set to a logical "1" at all times unless a partial bit write is performed.

The shifting function of the input shadow register 153 and the input bit shift register 106 will cause the valid data bits and corresponding shadow bits written to the input bit shift and input shadow registers 106 and 153, respectively, to shift to the right, until the valid data bits are supplied to the serial output. In particular, after valid data bits are written to any one of the input register positions 109, with shadow bits written to corresponding shadow register positions 156 in a full parallel, partial parallel, or bit write fashion, the "write to register" command is set low. This causes the data/shift multiplexers 223 and the write/shift multiplexers 246 to apply the preceding D flip-flop output Q to the input D of the D flip-flop coupled to the output of the respective data/shift or write/shift multiplexer 223 or 246. In this situation, the input bit shift and input shadow registers 106 and 153 are said to be in a shift mode. The following discussion is with reference to the D flip-flops in the shadow register positions 156 labeled 1, 2, and N.

Assuming that the input bit shift and input shadow registers 106 and 153 are in the shift mode, when a shadow bit held by a D flip-flop 2 of the input shadow register 153 is a logical "0", then the inverted output $\overline{Q}$ of D flip-flop 2 is set high. Consequently, the output of the shift OR gate 253 coupled to the inverted output $\overline{Q}$ is set high. If the shadow bit held by the preceding D flip-flop 1 holds a logical "1", then the shift enable AND gate 256 is set high, which results in a high output at the enable OR gate 253 and the logical "1" is shifted from the preceding D flip-flop 1 in to the enabled D flip-flop 2.

If, while in the shift mode, the shadow bit held by D flip-flop 2 holds a logical "0", the inverted output $\overline{Q}$ of the D flip-flop 2 is set low. When the subsequent D flip-flop N is enabled, the output of the shift OR gate 257 attached to the enable input of D flip-flop N is set high. At the same time, when a logical "1" is seen at the output Q of the preceding D flip-flop 1, then the shift enable AND gate 257 receiving the output Q from the D flip-flop 1 is set high, which sets the enable OR gate 253 coupled to the enable input EN of the D flip-flop 2 high, shifting the shadow bit from D flip-flop 1 to 2, and from D flip-flop 2 to N.

To summarize the above statements, a shadow register position is empty if it holds a logical "0", and is full if it holds a logical "1". A full shadow register position 156 will only receive data shifted from the left when it can shift its shadow bit to the right. However, an empty shadow register position 156 will always receive data to be shifted from the left, but will not shift its logical "0" to the right. Thus, after a bit or a number of bits are written to the input shadow register 153 and the FIFO register circuit 200 transitions from a write mode to a shift mode where the data bits will automatically shift to the right if the adjacent shadow register position 156 to the right is empty, or if the same shadow register position 156 is full and is shifting to the right as well. For the purposes of this application, this automatic shifting nature of the FIFO register circuit 200 is termed a trickle effect. The same trickle effect is experienced in all of the bit shift registers employed in the PSP circuit 100. Note that the data bits in the input bit shift register 106 are shifted simultaneously along with the shadow bits in the input shadow register 153 which maintains a serial data stream at the serial output.

In the cases of a partial parallel and a full parallel write, the "Write to Register" command is set high which causes the initial shadow multiplexer 236, the write/shift multiplexers 246, and the data/shift multiplexers 223 to apply the values on the data bus 103 and the shadow bus 161 to be applied to the inputs of the input register positions 109 and the shadow register positions 156. Also, the bit write multiplexer 216 applies the value on the data bus 103 to the input of the leftmost input register position 109. Simultaneously, the different bits of the shadow bus 161 together with the decoded "Write to Register" command enable any shadow register position 156 via the write enable AND gates 249 and the enable OR gates 253 where the respective shadow bit is set to a logical "1". In the case of a full parallel write, all of the bits on the shadow bus 161 are set to a logical "1" and all the data bits written to shadow register positions 156 and their corresponding input register positions 109 are shifted to the right as discussed previously.

In the case of a partial parallel write, one or more of the shadow bits on the shadow bus 161 may be set to a logical "0" which results in the corresponding shadow register position 156 and its companion input register position 109 staying in a disabled state. In this case, the disabled shadow register position 156 and its corresponding disabled input register position 109 retain their original values. Thus, after a partial parallel write is executed, only the data bits in the input register positions 109 with a logical "1" in the corresponding shadow register position 156 will be shifted to the right as was discussed above.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A circuit for performing byte alignment in a communications apparatus, comprising:
   an input bit shift register having a predetermined number of register positions, the input bit shift register having a bit input, a register input, and a bit shift output, the input bit shift register being configured to receive data from a data bus; and
   an output bit shift register having the predetermined number of register positions, the output shift register having a bit output, a register output, and a bit shift input coupled to the bit shift output, the output bit shift register being configured to output data to the data bus.

2. The circuit of claim 1, wherein
   the register input further comprises a plurality of register position inputs electrically coupled to said data bus, and
   the register output further comprises a plurality of register position outputs electrically coupled to said data bus.

3. The circuit of claim 1, further comprising:
   an input shadow register having the predetermined number of register positions, wherein a logical one written to a register position in the input shadow register indicates a valid data bit in a corresponding input bit shift register position, the input shadow register having a shadow bit shift output; and
   an output shadow register having the predetermined number of register positions, the output shadow register having a shadow bit shift input coupled to the shadow bit shift output.

4. The circuit of claim 1, further comprising a register write available output indicating the availability of a register output write from the output bit shift register.

5. The circuit of claim 1, further comprising a bit write available output indicating the availability of a bit output write from one of the register positions of the output bit shift register.

6. A circuit for performing byte alignment, comprising:

means for reading a predetermined number of bits from a data bus, the predetermined number of bits being out of alignment relative to the data bus;

means for shifting the predetermined number of bits into alignment with the data bus; and means for writing the aligned data bits to the data bus.

7. The circuit of claim 6, further comprising means for indicating whether a data bit read from the data bus is valid.

8. The circuit of claim 6, further comprising means for indicating whether a predetermined number of bits are aligned to allow parallel writing to the data bus.

9. The circuit of claim 6, further comprising means for indicating whether a single bit is aligned to allow bit writing to the data bus.

10. A method for performing byte alignment, comprising the steps of:

reading a predetermined number of bits from a data bus, the predetermined number of bits being out of alignment relative to the data bus;

shifting the predetermined number of bits into alignment with the data bus; and writing the aligned data bits to the data bus.

11. The method of claim 10, further comprising the step of indicating whether a data bit read from the data bus is valid.

12. The method of claim 10, further comprising the step of indicating whether a predetermined number of bits are aligned to allow parallel writing to the data bus.

13. The method of claims 10, further comprising the step of indicating whether a single bit is aligned to allow bit writing to the data bus.

* * * * *

UNITED STATES PATENT AND TRADEMARK OFFICE
CERTIFICATE OF CORRECTION

PATENT NO. : 6,442,178 B1
DATED : August 27, 2002
INVENTOR(S) : Arato et al.

It is certified that error appears in the above-identified patent and that said Letters Patent is hereby corrected as shown below:

<u>Title page,</u>
Item [57], ABSTRACT,
Line 6, after "with", delete "the same" and replace with -- a --.

<u>Column 2,</u>
Line 25, after "with", delete "the same" and replace with -- a --.

<u>Column 10,</u>
Line 38, after "having", delete "the" and replace with -- a --.

Signed and Sealed this

Thirty-first Day of December, 2002

JAMES E. ROGAN
*Director of the United States Patent and Trademark Office*